US008087291B2

(12) United States Patent
Michalske et al.

(10) Patent No.: US 8,087,291 B2
(45) Date of Patent: Jan. 3, 2012

(54) METHOD FOR PERFORMING A DIAGNOSTIC ON AN EXHAUST GAS ANALYZER PROBE DISPOSED IN THE EXHAUST SYSTEM OF AN INTERNAL COMBUSTION ENGINE AND DEVICE FOR IMPLEMENTING THE METHOD

(75) Inventors: Andreas Michalske, Leonberg (DE); Thomas Steinert, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 12/419,402

(22) Filed: Apr. 7, 2009

(65) Prior Publication Data

US 2009/0255328 A1 Oct. 15, 2009

(30) Foreign Application Priority Data

Apr. 10, 2008 (DE) ........................ 10 2008 001 121

(51) Int. Cl.
*G01M 15/10* (2006.01)

(52) U.S. Cl. ...................................... 73/114.69; 701/34

(58) Field of Classification Search .................... 60/276, 60/277; 73/23.31, 23.32, 114.69, 114.71, 73/114.72, 114.73; 701/34

See application file for complete search history.

(56) References Cited

U.S. PATENT DOCUMENTS

| | | | | |
|---|---|---|---|---|
| 7,269,996 | B2 * | 9/2007 | Schnaibel et al. | 73/114.72 |
| 7,568,376 | B2 * | 8/2009 | Strohmaier et al. | 73/23.21 |
| 2008/0000286 | A1 * | 1/2008 | Strohmaier et al. | 73/23.21 |
| 2009/0044612 | A1 * | 2/2009 | Schoenthaler et al. | 73/114.71 |
| 2009/0100922 | A1 * | 4/2009 | Korbel et al. | 73/114.72 |
| 2009/0151437 | A1 * | 6/2009 | Saunders | 73/114.73 |

FOREIGN PATENT DOCUMENTS

DE 197 22 334 12/1998

* cited by examiner

*Primary Examiner* — Eric S McCall

(74) *Attorney, Agent, or Firm* — Kenyon & Kenyon LLP

(57) ABSTRACT

A method for performing a diagnostic on an exhaust gas analyzer probe disposed in the exhaust system of an internal combustion engine, and a device for implementing the method are provided. The method performs the evaluation of the exhaust gas analyzer probe after recognition of a special operating phase, e.g., an overrun phase, of the internal combustion engine by setting off a specifiable injection that is torque-neutral or not perceptible for the operator, on the basis of the predicted probe signal pattern and taking into account the delay time of the probe signal.

15 Claims, 2 Drawing Sheets

METHOD FOR PERFORMING A DIAGNOSTIC ON AN EXHAUST GAS ANALYZER PROBE DISPOSED IN THE EXHAUST SYSTEM OF AN INTERNAL COMBUSTION ENGINE AND DEVICE FOR IMPLEMENTING THE METHOD

BACKGROUND INFORMATION

German Patent Application No. DE 197 22 334 describes that, to perform a diagnostic on an exhaust gas analyzer probe which reacts sensitively to at least one exhaust-gas component, to utilize the rate of change with which the signal reacts to changes in the concentration of the exhaust-gas component. In so doing, in a recognized overrun phase of the internal combustion engine, the time until the probe signal reacts to the altered concentration of the exhaust-gas component is measured. A precise prediction of the probe signal to be anticipated is not readily possible based on the prevailing operating conditions such as the overrun phase of the internal combustion engine with fuel cutoff.

SUMMARY OF THE INVENTION

The procedure according to the present invention has the advantage that the diagnostic of the exhaust gas analyzer probe is performed after a special operating state of an internal combustion engine is recognized. To evaluate the probe signal, in a special recognized operating state of the internal combustion engine, a torque-neutral or a specifiable test injection not disturbing to the operator of the internal combustion engine is set off.

Based on a specifiable quantity of test fuel injected in the test injection, it is possible to calculate with sufficient accuracy the time to be expected until the signal of the exhaust gas analyzer probe changes, the rate of change of the signal and/or the signal pattern. The quantity of test fuel to be injected, specifiable independently of the torque desired by the operator, allows a precise assignment of these features to the point of injection, and thereby makes it possible to examine the performance of the exhaust gas analyzer probe.

One special operating state in which the signal of an exhaust gas analyzer probe is evaluated is an overrun phase of the internal combustion engine. To recognize an overrun phase, various signals, e.g., the amount of fuel injected and the instantaneous engine speed, are monitored. For example, one possible combination of conditions to monitor is whether the fuel quantity injected during the present operating state lies below a specifiable threshold value, and whether the instantaneous engine speed is greater than a specifiable idling speed. If all signal conditions for recognizing an overrun phase are satisfied, the internal combustion engine is then in a special operating state which may be used advantageously for monitoring an exhaust gas analyzer probe.

A further special advantageous operating state in which the signal of the exhaust gas analyzer probe may be evaluated is a quasi steady-state condition of the internal combustion engine. A quasi steady-state condition exists when the signals relevant for the diagnostic of the exhaust gas analyzer probe change only slightly. One possible combination of signal conditions relevant for the diagnostic is, for example, the check as to whether the fuel quantity injected during the present operating state and the instantaneous air mass lie within predefined threshold values. If this is the case, an operating state of the internal combustion engine special for performing a diagnostic on the exhaust gas analyzer probe is then reached.

A further advantage is the consideration of the delay time until the probe signal follows a change in the exhaust-gas composition resulting from the injection.

This ascertained delay time between a combustion process taking place and the time lag until the altered exhaust-gas composition has covered the exhaust tract up to the exhaust gas analyzer probe is used by approximation as the operating-point-dependent dead time of the probe signal for the further signal evaluation. Another refinement of the subject matter according to the present invention provides that, after a signal change and/or signal acquisition, to perform a setpoint/actual-value comparison of the ascertained actual dead time to a setpoint dead time stored in the control unit. The result of this check, e.g., by a threshold-value comparison to a maximally allowed dead time, is used for the qualitative assessment and/or for diagnosing the probe signal and/or the exhaust gas analyzer probe.

A further advantage is the sufficiently precise calculation of the setpoint signal pattern of the exhaust gas analyzer probe owing to the specifiable injection quantity during a suitable overrun phase. For example, the setpoint signal pattern is calculated from the ratio of the injected quantity to the air mass and the time.

The refinement of the subject matter according to the present invention provides for performing a setpoint/actual-value comparison after a signal change, and to compare the actual signal pattern of the exhaust gas analyzer probe to the calculated setpoint signal pattern. For this signal comparison, certain features of the signal pattern are taken into account for the assessment, e.g., the rate of rise or rate of fall between two points, or perhaps points of symmetry. This comparison permits a qualitative assessment and/or diagnosis of the probe signal and/or of the exhaust gas analyzer probe.

If the signal evaluation is not concluded successfully, then a fault condition of the probe signal and/or of the exhaust gas analyzer probe is recognized or a suitable operating state for performing a signal evaluation was left prematurely and the diagnostic could not be completed; otherwise, the diagnostic is concluded successfully. The occurrence of a fault condition may be signaled by switching on a fault light, for example.

The device of the present invention for implementing the method relates first of all to a specially prepared control unit that includes means for implementing the method, and an exhaust gas analyzer probe.

Preferably, the device of the present invention for implementing the method uses a broadband lambda probe as an exhaust gas analyzer probe.

The control unit preferably includes at least one electrical memory in which the method steps are stored in the form of a control-unit program.

The control-unit program of the present invention provides that all steps of the method according to the present invention are executed when it runs in a control unit.

The control-unit program product of the present invention having a program code stored on a machine-readable medium executes the method according to the present invention when the program runs in a control unit.

DETAILED DESCRIPTION

A lambda control is an important part for controlling the combustion and permitting effective exhaust-gas-cleaning processes for internal combustion engines. In cooperation with currently available ignition and injection systems, it is possible to achieve very low emission values. The lambda value indicates to what extent the air-fuel mixture actually present deviates from the mass ratio of 14.5 kg air to 1 kg diesel fuel theoretically necessary for the complete combustion. In this context, lambda is the quotient of the air mass supplied and the theoretical air requirement.

To monitor the dynamic properties of, for example, broadband lambda probes, the rise of the probe signal in response to certain changes in the state of the internal combustion engine is evaluated; to classify the properties, various quantities are acquired, e.g., delay time of the signal change, the gradient of the probe signal or the relationship of setpoint signal changes and actual signal changes.

Figure 1:
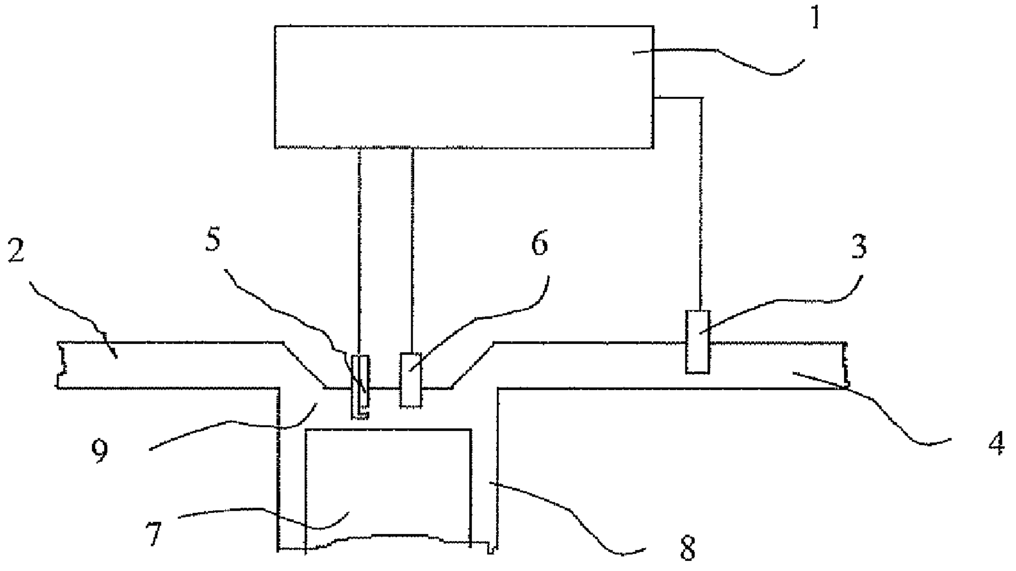
FIG. 1 shows a technical environment in which a method according to the present invention proceeds.

FIG. 1 shows an internal combustion engine having a control unit 1 which, among other things, has the task of acquiring and evaluating signals. Outside air is conducted via fresh-air feed 2 into combustion chamber 9 formed of cylinder 8 and piston 7. To permit a better overall view, the intake and exhaust valves are not shown. Fuel is injected into the combustion chamber via injection nozzle 6. After compression by the piston, the air-fuel mixture is ignited by spark plug 5. The energy released by the combustion process is transferred by a downward movement of the piston to a connecting rod (not shown). In the exhaust stroke, the gaseous combustion product is fed through discharge pipe 4 to the exhaust tract. An exhaust gas analyzer probe 3, e.g., a lambda probe projecting into the discharge pipe measures the composition of the air-fuel mixture. For better overall view, the method is illustrated for only one cylinder in FIG. 1. The method, shown by way of example for the spark-ignition engine, is possible with other forms of an internal combustion engine, such as a diesel engine, mixed forms between spark-ignition engine and diesel engine, a combination of various drive systems, what are referred to as hybrids or gas engines, as well.

Figure 2:
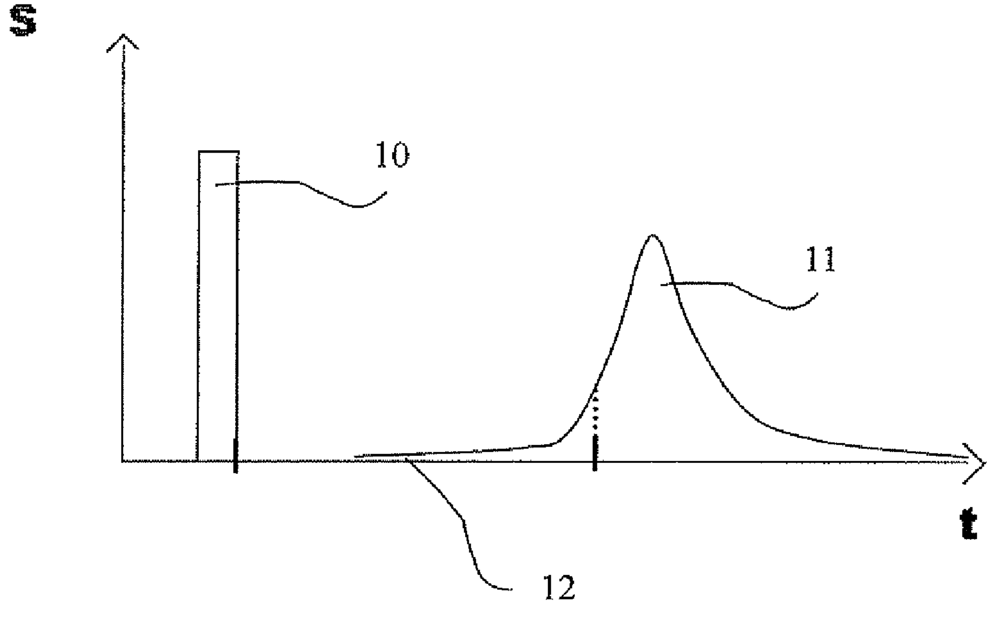
FIG. 2 shows the reaction of an exhaust gas analyzer probe situated in the exhaust system of an internal combustion engine.

FIG. 2 shows the reaction of the probe signal to an injection signal. The time is plotted along the X-axis; the Y-axis represents the signal strength. Signal 10 represents an injection having a specific injection strength (height of the signal=Y-axis) and injection period (time duration=X-axis). The injection quantity is yielded by the product of injection strength and injection period. After a delay time 12, the exhaust gas analyzer probe reacts with a signal 11 to the change in the composition of the exhaust gas as a result of the injection of a test fuel quantity. Associated with an injection is usually a contribution of the injected fuel to a torque of the internal combustion engine. It is important here that the injection quantity, the point of injection and the operating point of the internal combustion engine be selected so that no torque contribution disturbing for the operator of the internal combustion engine is given by the injection. Therefore, an operating phase of the internal combustion engine is selected in which the injection delivers no or only a very slight perceptible contribution to the torque. Furthermore, the injection quantity is suitably selected. Shown here in FIG. 2 is a single injection which, from its duration, is selected so that no appreciable increase of the torque occurs. Alternatively, a plurality of small test injections, very brief in time, may also be used which directly succeed one another and thus quasi represent one injection prolonged in time with reduced injection strength. An overrun condition of the internal combustion engine is particularly suitable as an operating phase in which a torque-neutral injection may take place. For example, such an overrun condition is a vehicle state in which the engine is maintained in rotational movement by the vehicle. A typical overrun condition, for instance, is coasting with engaged clutch on the expressway without actuating the accelerator pedal. In the case of a steady-state internal combustion engine for the purpose of generating electrical energy, idling is a suitable operating phase. A quasi steady-state condition of the internal combustion engine may be used as a further operating state. Such a state is characterized by a very slow change of signals over time.

The probe signal is shown in FIG. 2. For example, broadband lambda probes, exhaust-gas temperature probes or other probes which measure the chemical composition or a physical property (e.g., particulate number) of the exhaust gas are considered here as possible probes. The sensor signal will then be formed accordingly. Essentially, delay time 12, also known as dead time, may be used here for the later diagnostic of the exhaust gas analyzer probe. The absolute height of the signal or the rate of change of the signal may also be used. Since the injection also has a defined end, the fall of the probe signal may also be evaluated. Which signal is suitable for the specific probe type is determined based on the properties of the exhaust gas analyzer probe. The further description is provided based on the example of a lambda probe in which the dead time and the signal rise time are important (in addition to other parameters).

Figure 3:
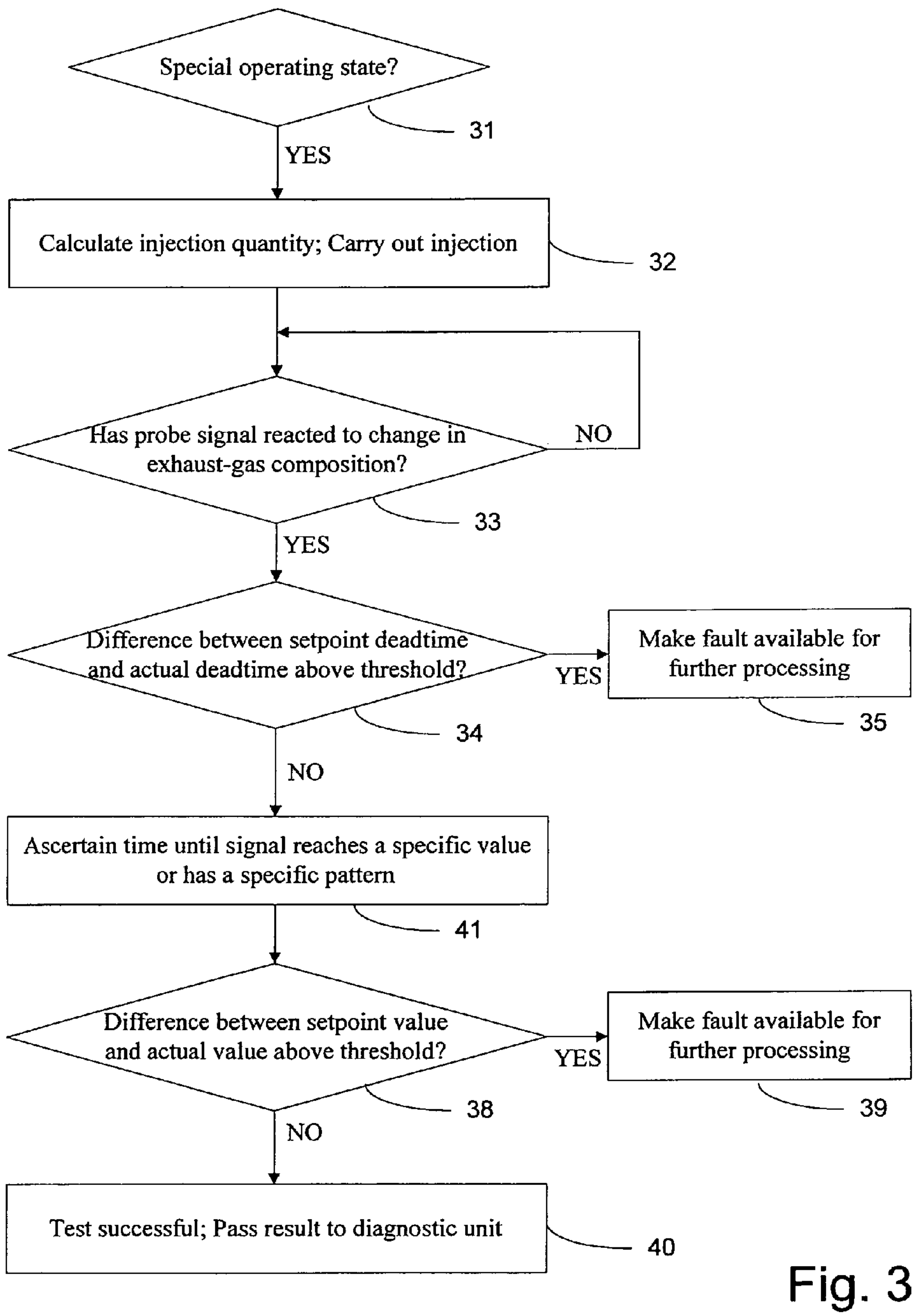
FIG. 3 shows a flow chart of the control-unit program according to the present invention.

The flow chart illustrated in FIG. 3 shows the method for performing a diagnostic on the exhaust gas analyzer probe, using a lambda probe as an example. The dead time up to the first reaction of the probe signal is utilized to monitor the exhaust gas analyzer probe of an internal combustion engine, and the predicted signal rise is utilized for the signal evaluation. To that end, in a first method step 31, a special operating state of the internal combustion engine is ascertained in which, for example, the oxygen concentration has a constant known value. In the case of a motor vehicle, such special, suitable operating states are overrun phases or quasi steady-state conditions of the motor vehicle in which the internal combustion engine is mounted.

When a suitable operating state is ascertained, in a further method step 32, the injection quantity that is dependent on the instantaneous operating point and is torque-neutral and/or an injection quantity not disturbing to the operator is calculated. This injection quantity is very small in comparison to a torque-effective injection quantity, and an injection as a function of the instantaneous operating point is carried out substantially later in time than a main injection, for instance. The signal change and/or rate of rise to be anticipated may be predicted accurately through the specifiable quantity of fuel intended to be used for the injection. A combustion takes place in the internal combustion engine owing to the quantity of fuel predefined for the injection system.

In the next method step 33, the time until the probe signal reacts to the change in the exhaust-gas composition is ascertained. This ascertained delay time is stored by approximation as operating-point-dependent actual dead time for the further evaluation. The feedback loop of the method step represents the continual query as to whether a change of the probe signal exists. If a change in the probe signal is recognized, the ascertained dead time is stored. Not shown is the abort condition of the query, for which a defined, maximum time span is waited, until the probe signal follows the altered exhaust-gas composition. If this threshold is exceeded, then a fault, e.g., a defective exhaust gas analyzer probe exists.

In the following method step 34, a stored operating-point-dependent setpoint dead time is compared to the actual dead time ascertained in the preceding method step. Here, it is checked whether the deviation between the ascertained actual dead time and the setpoint dead time lies below the specifiable threshold value. If the deviation between the setpoint dead time and actual dead time lies above the threshold value, a fault in the exhaust gas analyzer probe may be inferred. In a further method step 35, the fault data is made available for further processing; for instance, this may be accomplished in the form of a fault-data storage and/or relay to diagnostic units. The occurrence of a fault may also be signaled, for instance, by switching on a fault light.

In a further method step 41, the time until the signal reaches a specific value or has a specific signal pattern is ascertained. For example, this may be the actual probe-signal rise time until the signal has exceeded a threshold value. Alternatively, properties such as gradients between points, particularly the rise of the probe signal from 30% to 60% of the maximum value, or the signal fall time from a maximum value to a minimum value are also conceivable. In this method step, the setpoint probe-signal rise time to be anticipated is additionally calculated from various properties, e.g., as a function of the transmitted injection quantity and air mass. A further possibility is that setpoint probe-signal rise times to be expected are stored in a memory in the control unit as a function of various properties, and in this method step, these values are loaded from the memory instead of being calculated. The signal of the actual probe-signal rise time is freed from noise by low-pass filtering carried out in this method step.

In the following method step 38, a setpoint/actual-value comparison of the probe-signal rise times ascertained in the preceding method step is carried out. It is ascertained whether the actual probe-signal rise time corresponds to the anticipated signal pattern of the setpoint probe-signal rise time. Stored threshold values are utilized for assessing the positive or negative deviation of the actual signal from the calculated setpoint signal. In the event there are no probe faults, the filtered actual signal lies in the range defined by the threshold values around the setpoint signal. As an alternative to the setpoint/actual-value comparison of the rise time, a setpoint/actual-value comparison of the fall time of the probe signal may be carried out. Various assessment criteria such as range check, signal pattern, point check, number of allowed overshoots or undershoots and/or combinations of these criteria are used for checking the probe signal. For example, in one application case, the complete signal pattern in which the rise of the probe signal from 30% to 60% of the maximum value and the fall of the probe signal from 60% to 30% of the maximum value are characteristic may be utilized for examining the probe. If a deviation of the setpoint signal from the actual signal outside of the tolerance range defined by the threshold values is determined, a fault in the exhaust gas analyzer probe may be inferred. In a further method step 39, the fault data is made available for further processing; for instance, this may be accomplished as in method step 35 in the form of a fault-data storage and/or relay to diagnostic units. In the following method step 40, the successful test of the probe is completed, and the result is passed on to a diagnostic unit, for instance.

What is claimed is:

1. A method for performing a diagnostic on at least one exhaust gas analyzer probe situated in an exhaust system of an internal combustion engine, the method comprising:

determining that the engine is operating in a special operating state which includes one of an overrun phase and a quasi steady-state phase;

responsive to the determining that the engine is in the special operating state, applying at least one test injection, at least one of a duration and a starting time of the at least one test injection being selected so that no appreciable increase in torque occurs as a result of the at least one test injection;

after applying the at least one test injection, obtaining an actual signal characteristic of a signal generated by the probe in response to the at least one test infection;

comparing the actual signal characteristic to an expected signal characteristic; and outputting an indication that the probe is faulty in response to determining that a deviation between the actual and the expected signal characteristics exceeds a predetermined threshold.

2. The method according to claim 1, wherein:

the actual signal characteristic is a delay time measured from when the at least one test injection is applied to when the probe begins to generate its signal; and the expected signal characteristic is one of a stored and a calculated setpoint delay time.

3. The method according to claim 1, wherein:

the actual signal characteristic is a measured signal pattern generated by the probe; and the expected signal characteristic is a setpoint signal pattern that is stored or calculated as a function of a ratio of an injected fuel quantity to an air-mass quantity, and as a function of a time quantity characteristic for the setpoint signal pattern.

4. The method of claim 1, wherein:

the actual signal characteristic is the time until the signal generated by the probe reaches a specific value or has a specific signal pattern; and the expected signal characteristic is the rise time until the signal generated by the probe has exceeded a threshold value.

5. The method of claim 1, wherein the at least one test injection includes a plurality of injections spaced briefly apart so as to approximate a single injection which occurs over an extended period of time.

6. The method of claim 1, wherein the actual signal characteristic is an absolute height of the signal generated by the probe.

7. The method of claim 1, wherein the actual signal characteristic is a rate of change of the signal generated by the probe.

8. The method of claim 1, wherein the actual signal characteristic relates to a rise of the signal generated by the probe.

9. The method of claim 1, wherein the actual signal characteristic relates to a fall of the signal generated by the probe.

10. The method of claim 1, wherein the actual signal characteristic is a length of time between when the at least one test injection is applied and when the signal generated by the probe reaches a predetermined value or exhibits a predetermined signal pattern.

11. The method of claim 1, wherein the actual signal characteristic is a length of time required for the signal generated by the probe to go from a first predetermined value to a second predetermined value.

12. The method of claim 11, wherein the first predetermined value and the second predetermined value respectively correspond to 30% and 60% of a maximum value of the signal generated by the probe.

13. A device for monitoring at least one exhaust gas analyzer probe situated in an exhaust system of an internal combustion engine, comprising:

a control unit performing the following:

determining that the engine is operating in a special operating state which includes one of an overrun phase and a quasi steady-state phase;

responsive to the determining that the engine is in the special operating state, applying at least one test injection, at least one of a duration and a starting time of the at least one test injection being selected so that no appreciable increase in torque occurs as a result of the at least one test injection;

after applying the at least one test injection, obtaining an actual signal characteristic of a signal generated by the probe in response to the at least one test injection;

comparing the actual signal characteristic to an expected signal characteristic; and outputting an indication that the probe is faulty in response to determining that a deviation between the actual and the expected signal characteristics exceeds a predetermined threshold.

14. The device according to claim 13, wherein the probe is a broadband lambda probe.

15. A non-transitory computer-readable medium containing a computer program which, when executed by a processor, performs the following method for performing a diagnostic on at least one exhaust gas analyzer probe situated in an exhaust system of an internal combustion engine:

determining that the engine is operating in a special operating state which includes one of an overrun phase and a quasi steady-state phase;

responsive to the determining that the engine is in the special operating state, applying at least one test injection, at least one of a duration and a starting time of the at least one test injection being selected so that no appreciable increase in torque occurs as a result of the at least one test injection;

after applying the at least one test injection, obtaining an actual signal characteristic of a signal generated by the probe in response to the at least one test injection;

comparing the actual signal characteristic to an expected signal characteristic; and outputting an indication that the probe is faulty in response to determining that a deviation between the actual and the expected signal characteristics exceeds a predetermined threshold.

* * * * *